United States Patent
Robinson et al.

(10) Patent No.: US 8,411,855 B1
(45) Date of Patent: Apr. 2, 2013

(54) SIZE OPTIMIZATION FOR LARGE ELLIPTIC CURVE CRYPTOGRAPHY SCALAR MULTIPLICATION ACCELERATION TABLES

(75) Inventors: Peter Alan Robinson, Enoggera Reservoir (AU); David Paul Makepeace, Middle Park (AU); Sean Parkinson, Indooroopilly (AU); Mark Hibberd, Neutral Bay (AU)

(73) Assignee: EMC Corporation, Hopkinton, MA (US)

( * ) Notice: Subject to any disclaimer, the term of this patent is extended or adjusted under 35 U.S.C. 154(b) by 690 days.

(21) Appl. No.: 12/633,400

(22) Filed: Dec. 8, 2009

Related U.S. Application Data (60) Provisional application No. 61/122,116, filed on Dec. 12, 2008, provisional application No. 61/122,120, filed on Dec. 12, 2008, provisional application No. 61/122,125, filed on Dec. 12, 2008, provisional application No. 61/122,131, filed on Dec. 12, 2008.

(51) Int. Cl.
*H04L 9/00* (2006.01)

(52) U.S. Cl. ............ 380/30; 380/28; 713/171; 713/172; 713/168; 713/150

(58) Field of Classification Search ........................ None
See application file for complete search history.

(56) References Cited

U.S. PATENT DOCUMENTS

| | | | |
|---|---|---|---|
| 6,263,081 B1 | 7/2001 | Miyaji et al. | |
| 7,110,538 B2 | 9/2006 | Gallant et al. | |
| 7,412,062 B2 | 8/2008 | Lambert et al. | |
| 7,724,898 B2 | 5/2010 | Naslund et al. | |
| 7,991,154 B2 | 8/2011 | Longa et al. | |
| 8,204,232 B2 * | 6/2012 | Struik et al. | 380/282 |
| 2007/0064932 A1 * | 3/2007 | Struik et al. | 380/30 |

OTHER PUBLICATIONS

Robinson et al., "Elliptic Curve Cryptography Scalar Multiplication with on Demand Acceleration Table Generation," U.S. Appl. No. 12/569,284, filed Sep. 29, 2009.

Makepeace et al., "Using Multiples Above Two with Running totals in Elliptic Curve Cryptography Scalar Multiplication Acceleration Tables," U.S. Appl. No. 12/633,395, filed Dec. 8, 2009.

Parkinson et al., "Using Multiples Above Two with Running Totals and Reference Values Other Than 0 and 2 (Window Size) in Elliptic Curve Cryptogrpahy Scalar Multiplication," U.S. Appl. No. 12/569,280, filed Sep. 29, 2009.

Robinson et al., "Optimizing Algorithm for Large Elliptic Curve Cryptography Scalar Multiplication Acceleration Tables," U.S. Appl. No. 61/122,116, filed Dec. 12, 2008.

Makepeace et al., "Using Multiples Above Two with Running totals in Elliptic Curve Cryptography Scalar Multiplication Acceleration Tables," U.S. Appl. No. 61/122,120, filed Dec. 12, 2008.

(Continued)

*Primary Examiner* — Pramila Parthasarathy
(74) *Attorney, Agent, or Firm* — BainwoodHuang

(57) ABSTRACT

A computer program product and method are provided for optimizing the size of an Elliptic Curve Cryptography (ECC) scalar multiplication table. Steps include (a) receiving, from a user interface, a set of integer multipliers, (b) choosing a subset of a given set of target integers, the chosen subset defining an index set, such that elements of the index set generate all elements of the given set of target integers using a target generation function, and (c) modifying the index set by removing an element from the index set which is not necessary to generate an element of the given set of target integers using the target generation function. Additional steps are also included depending on the embodiment.

21 Claims, 2 Drawing Sheets

OTHER PUBLICATIONS

Parkinson et al., "Using Reference Values Other Than 0 and 2 (Window Size) in Elliptic Curve Cryptography Scalar Multiplication Acceleration Tables," U.S. Appl. No. 61/122,125, filed Dec. 12, 2008.

Robinson et al., "Fast to Generate Elliptic Curve Cryptography Scalar Multiplication Acceleration Tables," U.S. Appl. No. 61/122,131, filed Dec. 12, 2008.

U.S. Department of Commerce/National Institute of Standards and Technology, "Digital Signature Standard (DSS)," Federal Information Processing Standards Publication, FIPS PUB 186-2, Jan. 27, 2000, 72 pages.

López et al., "An Overview of Elliptic Curve Cryptography," Relatório Técnico IC-00-10, May 2000, pp. 1-34.

* cited by examiner

SIZE OPTIMIZATION FOR LARGE ELLIPTIC CURVE CRYPTOGRAPHY SCALAR MULTIPLICATION ACCELERATION TABLES

CROSS REFERENCE TO RELATED APPLICATIONS

This Patent Application claims the benefit under 35 U.S.C. §119(e) of U.S. Provisional Patent Application No. 61/122,116 filed on Dec. 12, 2008, entitled, "OPTIMIZING ALGORITHM FOR LARGE ELLIPTIC CURVE CRYPTOGRAPHY SCALAR MULTIPLICATION ACCELERATION TABLES," the contents and teachings of which are hereby incorporated by reference in their entirety. This Patent Application claims the benefit under 35 U.S.C. §119(e) of U.S. Provisional Patent Application No. 61/122,120 filed on Dec. 12, 2008, entitled, "USING MULTIPLES ABOVE TWO WITH RUNNING TOTALS IN ELLIPTIC CURVE CRYPTOGRAPHY SCALAR MULTIPLICATION ACCELERATION TABLES," the contents and teachings of which are hereby incorporated by reference in their entirety. This Patent Application claims the benefit under 35 U.S.C. §119(e) of U.S. Provisional Patent Application No. 61/122,125 filed on Dec. 12, 2008, entitled, "USING REFERENCE VALUES OTHER THAN 0 AND 2^(WINDOW SIZE) IN ELLIPTIC CURVE CRYPTOGRAPHY SCALAR MULTIPLICATION ACCELERATION TABLES," the contents and teachings of which are hereby incorporated by reference in their entirety. This Patent Application claims the benefit under 35 U.S.C. §119(e) of U.S. Provisional Patent Application No. 61/122,131 filed on Dec. 12, 2008, entitled, "FAST TO GENERATE ELLIPTIC CURVE CRYPTOGRAPHY SCALAR MULTIPLICATION ACCELERATION TABLES," the contents and teachings of which are hereby incorporated by reference in their entirety.

This Patent Application is related to the U.S. patent application Ser. No. 12/569,280 entitled "USING MULTIPLES ABOVE TWO WITH RUNNING TOTALS AND REFERENCE VALUES OTHER THAN 0 AND 2^(WINDOW SIZE) IN ELLIPTIC CURVE CRYPTOGRAPHY SCALAR MULTIPLICATION ACCELERATION TABLES" and No. 12/569,284 entitled "ELLIPTIC CURVE CRYPTOGRAPHY SCALAR MULTIPLICATION WITH ON-DEMAND ACCELERATION TABLE GENERATION," both filed on Sep. 29, 2009. This Patent Application is related to the U.S. patent application Ser. No. 12/633,395 entitled "USING MULTIPLES ABOVE TWO WITH RUNNING TOTALS IN ELLIPTIC CURVE CRYPTOGRAPHY SCALAR MULTIPLICATION ACCELERATION TABLES," filed on even date herewith by David Paul Makepeace, Sean Parkinson, Mark Hibberd, and Peter Alan Robinson.

BACKGROUND

Public key cryptography is a technique for protecting communications or authenticating messages. Using this technique, electronic devices wishing to transmit information amongst themselves each possess a public key and a private key. Each electronic device's private key is kept by that electronic device as a secret from all other electronic devices. Each electronic device's public key may be widely distributed amongst other electronic devices. Each corresponding public key and private key are related mathematically, but the private key cannot be practically derived from the public key. In use, for example, a first electronic device wishing to send an encrypted message to a second electronic device first encrypts the message with the second electronic device's public key. The first electronic device then forwards the encrypted message to the second electronic device. Upon receiving the encrypted message, the second electronic device decrypts the message with the second electronic device's private key.

One way of creating public and private keys is through the use of Elliptic Curve Cryptography (ECC). ECC incorporates a group of points on an elliptic curve defined over a finite field in the production of public and private keys. ECC is useful for defining the relationship between public and private keys because there is no sub-exponential algorithm known to solve a discrete logarithm problem on a properly chosen elliptic curve. The lack of such a known algorithm ensures that a private key cannot be practically derived from its corresponding public key. The performance of ECC depends on the speed of finite field operations and scalar multiplication and the choice of curve and finite field. While there is a standard type of elliptic curve equation, there are many different elliptic curves. They are distinguished by the values of their coefficients and the finite field over which they are defined.

Curves in common use are standardized by organizations such as the National Institute of Standards and Technology (NIST) and American National Standards Institute (ANSI). These standardized curves are given names and are referred to as named curves. Despite being called named curves, they actually define an elliptic curve group. An elliptic curve group is defined by an operation that can be applied to points on an elliptic curve, referred to as point addition, together with a set of points on the curve. This set of points is defined such that, given a point on the elliptic curve (i.e., a base point, or a generator point), all points in the set can be obtained by successive application of the point addition operation to the base point. The elliptic curve group includes the point at infinity which is the additive identity of the group. The number of points in the elliptic curve group is called the order. An example named curve is P256, which is defined in NIST's Digital Signature Standard issued on Jan. 27, 2000 as FIPS 186-2, the contents and teachings of which are hereby incorporated by reference in their entirety. Other examples of named curves include B283, K283, B409, K409, P384, B571, K571, and P521.

ECC scalar multiplication is the multiplication of a point on the elliptic curve by a scalar. While ECC scalar multiplication can be described in terms of successively applying point addition, there are techniques available that allow a scalar multiplication to be performed more quickly. ECC scalar multiplication can be accelerated by pre-generating multiples of the point to be multiplied. This set of pre-generated values is called an acceleration table. Acceleration tables are made up of sub-tables, each sub-table being used to calculate a partial result for a subset window size bits in length of the scalar.

SUMMARY

Unfortunately, there are deficiencies to the above-described conventional approach to ECC scalar multiplication. In particular, an acceleration table can get quite large, requiring large amounts of storage space. Furthermore, large acceleration tables cannot fit entirely within the cache of a microprocessor, thus requiring frequent swapping to and from memory, which can slow performance.

An improved technique involves reducing the size of the acceleration table by reducing the number of elements stored in each sub-table. Determining which elements are stored in each sub-table is a non-trivial problem for large window sizes. This technique provides an optimization for solving this problem. This technique thus helps decrease the size of the acceleration table, thereby decreasing the likelihood of frequent swapping into cache, which can improve performance. Furthermore, the reduced table size can be beneficial in contexts having limited storage space, such as in embedded devices.

One embodiment is directed to a computer program product. The computer program product includes a computer-readable storage medium that stores instructions, which, when performed by a computer, cause the computer to perform a set of operations. The set of operations includes (a) receiving, from a user interface, a set of integer multipliers, (b) choosing a subset of a given set of target integers, the chosen subset defining an index set, such that elements of the index set generate all elements of the given set of target integers using a target generation function, (c) modifying the index set by removing an element from the index set which is not necessary to generate an element of the given set of target integers using the target generation function, and (d) after modifying the index set, outputting, to the user interface, the index set.

Another embodiment is directed to a method for creating an acceleration table for an Elliptic Curve Cryptography (ECC) scalar multiplication table. The method includes (a) receiving, from user interface circuitry, a set of integer multipliers, (b) in a microprocessor, choosing a subset of a given set of target integers, the chosen subset defining an index set, such that elements of the index set generate all elements of the given set of target integers using a target generation function, (c) in the microprocessor, modifying the index set by removing an element from the index set which is not necessary to generate an element of the given set of target integers using the target generation function, (d) in the microprocessor, after modifying the index set, generating an ECC scalar multiplication table having a plurality of sub-tables, each sub-table having one entry for each element of the index set, and (e) storing the ECC scalar multiplication table on a computer-readable storage medium.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

I. Introduction

Elliptic Curve Cryptography (ECC) Scalar Multiplication is the multiplication of a point on a curve by a scalar. ECC scalar multiplication can be accelerated by pre-generating multiples of the point to be multiplied. This set of pre-generated values is called an acceleration table. Acceleration tables are made up of sub-tables, each sub-table being used to calculate a partial result for a sub-set window size bits in length of the scalar.

Traditionally, the partial results have been calculated by adding points from the table or subtracting points from the table and carrying one to the next sub-set of the scalar. This is equivalent to for each sub-table adding to a reference value of 0 or subtracting from a reference value of $2^{window\ size}$.

Embodiments are directed to a method of using reference values other than 0 and $2^{window\ size}$, for instance, values $-1 \times (2^{window\ size})$ or $2 \times (2^{window\ size})$. These methods can result in acceleration tables that are smaller and more efficient than those currently in use.

ECC is based on a group of points on an elliptic curve defined over a finite field. An elliptic curve is a plane curve of the form:

$$y^2 = x^3 + ax + b \quad \text{(Eq. 1)}$$

The performance of ECC depends on the speed of finite field operations and scalar multiplication, the choice of curve and finite field.

While there is a standard type of elliptic curve equation, there are many different elliptic curves. They are distinguished by the values of their coefficients (a and b) and the finite field over which they are defined.

An elliptic curve group is defined by an operation that can be applied to points on an elliptic curve, referred to as point addition, together with a set of points on the curve. This set of points is defined such that, given a point on the elliptic curve (also called a base point, or a generator point, G), all points in the set can be obtained by successive application of the point addition operation to the base point. The elliptic curve group includes the point at infinity which is the additive identity of the group. The number of points in the elliptic curve group is called the order.

Curves in common use are standardized by organizations such as the National Institute of Standards and Technology (NIST) and the American National Standards Institute (ANSI). These standardized curves are given names and are referred to as named curves. Despite being called named curves, they actually define an elliptic curve group. A curve that is used as an example curve throughout this document is P256, which is defined in NIST's FIPS186-2. Other examples include B283, K283, B409, K409, P384, B571, K571, and P521.

The scalar multiplication operation involves the multiplication of a point on an elliptic curve by a scalar (an integer). While it can be described in terms of successively applying point addition, there are several techniques available that allow a scalar multiplication to be performed much more quickly. One class of these techniques involves the use of a table of pre-generated multiples of the point to be scalar multiplied, known as an acceleration table.

ECC Scalar multiplication is used by a number of ECC algorithms such as Elliptic Curve Diffie-Hellman (ECDH), Elliptic Curve Digital Signature Algorithm (ECDSA), Dual Elliptic Curve Deterministic Random Bit Generator (ECDRBG), Elliptic Curve Integrated Encryption Scheme (ECIES), and elliptic curve key generation.

An understanding of the relative speed of point arithmetic operations is important when considering algorithms to speed up ECC calculations. The table below shows the relative processing speed of point arithmetic operations for a P256 curve on a 3.3 GHz Intel Pentium computer using Java Development Kit 1.5 (JDK) as released by Sun Microsystems of Santa Clara, Calif. The relative processing speed is expected to be similar for other curves. The term Zero refers to the point at infinity (i.e. the additive identity).

TABLE 1

Operations per Second, P256 Curve, Pentium 3.3 GHz, Sun JDK 1.5

| Point Operation | Absolute Operations Per Second | Operations Per Second Relative to Add |
|---|---|---|
| Add | 6932 | 1 |
| Add to Zero | 714109 | 0.01 |
| Double | 8000 | 0.87 |
| Double Zero | 656043 | 0.01 |
| Negate | 345267 | 0.02 |

What table 1 shows is that adding a point to a point which is zero, doubling a point which is zero, and negating a point are all relatively inexpensive operations relative to doubling and adding non-zero points. Doubling a point, however, is still less expensive than adding two points.

Scalar multiplication can be accelerated by pre-generating multiples of the point to be multiplied. This set of pre-generated values is called an acceleration table and is most commonly generated for the base points and public points of named curves.

To multiply a point P by a scalar k, consider splitting the binary representation of k into w-bit parts, or windows. For every scalar k less than the order of the elliptic curve group, the required scalar multiple can be written as the following sum:

$$kP = a_s*(2^{w(s-1)})P + \ldots + a_3*(2^{2w})P + a_2*(2^w)P + a_1P \quad (Eq. 2)$$

In this equation, ws is the bit length of the order of the group, and each of $a_1, \ldots, a_s$ range from 0 up to $(2^w-1)$. The value w is referred to as the window size. The value s is the number of windows in the binary representation in k. The binary representation of k is commonly required to be the same as the order of the group. Each of $a_1, \ldots, a_s$ represent the value of a window of bits of the scalar k.

For example for a window size of 3 bits, the scalar 441 can be written:

$$441P = (2^6)*6P + (2^3)*7P + 1P$$

$$441P = 384P + 56P + 1P$$

The multiples 6P, 7P, 1P, can be determined from the windows of bits of the binary representation of 441 which is 110 111 001.

Suppose that all of the following multiples were pre-generated:

TABLE 2

| | | |
|---|---|---|
| $(2^6) * 1P$ | $(2^3) * 1P$ | 1P |
| $(2^6) * 2P$ | $(2^3) * 2P$ | 2P |
| $(2^6) * 3P$ | $(2^3) * 3P$ | 3P |
| $(2^6) * 4P$ | $(2^3) * 4P$ | 4P |
| $(2^6) * 5P$ | $(2^3) * 5P$ | 5P |
| $(2^6) * 6P$ | $(2^3) * 6P$ | 6P |
| $(2^6) * 7P$ | $(2^3) * 7P$ | 7P |

To compute the scalar multiple kP for any scalar k of 9 bits simply requires (at most) the addition of one pre-generated point from each column. Note that it is not necessary to store a row for 0P, since the result is always zero.

In general, for an elliptic curve group where the order of the group is ws bits for a window size of w, any scalar multiple kP can be computed with a maximum of (s−1) addition operations.

This table of pre-computed multiples of a point is called an acceleration table. Each column of pre-generated values is referred to as a sub-table.

The estimated time required to perform a scalar multiplication operation using an acceleration table is (approximately) calculated by determining the total number of Add and Double operations that must be performed on average and then converting the number of Double operations to equivalent Add operations by applying the experimentally determined factor of 0.87 (as introduced above; see table 1).

Calculating the performance of scalar multiplication in this way assumes idealized hardware with either no CPU data cache or a very large data cache with no cache-misses occurring during the scalar multiplication. Cache-misses are expensive on modern CPUs as CPU speed has been increasing more rapidly than memory speed. This has been alleviated to some extent by larger caches and multi-level caches.

In practice, the performance of accelerated scalar multiplication is reduced as the number of cache-misses incurred while referencing points in the acceleration table increases. Un-accelerated scalar multiplication, however, has a small memory access footprint and is not likely to incur many cache-misses, even if the data cache is quite small.

The probability of a cache-miss occurring depends on the proportion of the acceleration table that is resident in the cache. If the acceleration table is larger than the cache size then accessing points in the acceleration table tend to displace other parts of the acceleration table from the cache. Other code executed by the CPU between scalar multiplication operations may also perform memory accesses that tend to displace parts of the acceleration table from the cache; this includes calculation of accelerated scalar multiples of other points.

In actual use on real hardware, the performance of scalar multiplication using large acceleration tables tend to be lower than the theoretical values estimated in this document, especially when the CPU is doing work other than calculating scalar multiples of the same point, while small acceleration tables tend to more closely achieve their theoretical performance levels. For this reason, small acceleration tables should be favored over large ones when the large table would only provide a small theoretical advantage. Depending on the hardware and the acceleration table used, it is even possible for un-accelerated scalar multiplication to out-perform accelerated scalar multiplication, especially when other techniques not covered in this document are used to improve the un-accelerated scalar multiplication.

Common CPUs in use today include level 1 data caches of 32 to 64 kilobytes (KB) (per core) and level 2 caches of 256 to 512 KB (per core). Some modern CPUs also contain slower integrated shared level 3 caches of up to 12 megabytes. Since a point in P256 contains two 256-bit values, about 512 bits (or 64 bytes) is needed per point. Thus, acceleration tables having significantly fewer than 512 points are beneficial for CPUs having a 32 KB cache, while acceleration tables having fewer than 1,024 points are beneficial for CPUs having a 64 KB cache. Significantly fewer points may be needed because additional data beyond the acceleration table may need to be stored in the cache as well, as noted above. An additional slowdown may be experienced as the size of the acceleration table approaches 4,096 points for a CPU having a 256 KB level 2 cache or 8,192 points for a CPU having a 512 KB level 2 cache. Similarly, an additional slowdown may be experienced for even larger acceleration tables exceeding the size of the layer 3 cache (e.g., more than 196,608 points for a 12 megabyte layer 3 cache, although this is unlikely to pose a problem). In practice, using common CPUs with 32 KB caches, acceleration tables having more than about 500 points tend to be quite inefficient. However, generally speaking, the smaller the acceleration table the better, although this must be balanced against the number of additional operation required to be performed to compensate for the reduced table size.

By reducing the number of multiples stored in each sub-table, and slightly modifying the method of performing the scalar multiplication, the acceleration table size can be greatly reduced while still maintaining significantly improved performance over un-accelerated multiplications.

There are a number of techniques to reduce the size of each sub-table. These techniques can be combined to produce acceleration tables suited to particular computational environments.

The smaller the window size is, the smaller the size of the acceleration table. However, this of course also means that the number of additions to compute the scalar multiple kP will increase. Window size choice also therefore depends on the size of the elliptic curve group since the larger the order, the larger the number of sub-tables in the acceleration table.

In elliptic curve groups, the subtraction of a point from another point requires a point negation and a point addition. A point negation involves the subtraction of one ordinate from the modulus. This is significantly faster than a point addition. Therefore, since negation is so inexpensive, the subtract operation is approximately as computationally expensive as addition. This fact can be taken advantage of to reduce the size of an acceleration table significantly.

Again, consider the acceleration table with a window size of 3 presented above. Now consider the multiple 5P: it can be computed by subtracting 3P from 8P. The multiple 3P already exists in the table, and the multiple 8P also exists in the table (as $(2^3)*1P$ in the second sub-table). Consequently, the multiple 5P is not required to be stored in the table, but can be obtained by adding 8P and subtracting 3P. This is achieved by carrying a bit from the first window into the second window, and adding the negation of 3P to the total.

The multiples 6P and 7P can both be calculated in a similar way, and are therefore not required in the table. The exclusion of these multiples can be propagated across all sub-tables, yielding the reduced size acceleration table as follows:

TABLE 3

| $(2^9) * 1P$ | $(2^6) * 1P$ | $(2^3) * 1P$ | 1P |
|---|---|---|---|
| | $(2^6) * 2P$ | $(2^3) * 2P$ | 2P |
| | $(2^6) * 3P$ | $(2^3) * 3P$ | 3P |
| | $(2^6) * 4P$ | $(2^3) * 4P$ | 4P |

Note the additional multiple that must be added to the acceleration table to account for the possibility of a carry from the third window.

Using this acceleration table, to compute the scalar multiple kP for any scalar k of 9 bits requires at most the three additions and three negations.

In general, for an elliptic curve group where the order of the group is ws bits for a window size of w, for the sub-table corresponding to the least significant bits of the scalar, all multiples greater than $2^{w-1}$ are not required in the acceleration table. The corresponding multiples in all other sub-tables can also be excluded. Any scalar multiple kP can be computed with a maximum of s addition operations and s negations.

All sub-tables contain the same number of multiples (ignoring the extra multiple mentioned above) and each entry can be calculated by multiplying the corresponding entry in the previous sub-table by $2^w$. The set of multiples in the first sub-table are therefore an attribute of the entire acceleration table and the multiplication factors used in the first table are referred to as the indices of the table. The indices of the acceleration table above are 1, 2, 3 and 4.

II. Using Two Running Totals

Again, consider the acceleration table with a window size of 3. Many multiples can be obtained by doubling an existing multiple. For example, 4P=2*2P.

Consider the removal of this multiple, and the corresponding multiples in other sub-tables, from the acceleration table. When 4P is required to be added as part of a scalar multiplication, instead of adding it to the running total, 2P can be added to a second running total of "to be doubled" points. To complete the scalar multiplication, this second running total can be doubled and added to the first running total. The multiple 6P can also be removed from the acceleration table and accounted for by adding 3P to the second running total. The additional cost of including this second running total is only the double and add required to complete the multiplication.

A first example acceleration table for the P256 curve (referred to as Crypto-C) includes a window size of five bits and indices 1, 3, 4, 5, 7, 9, 11, 12, 13, 15 and 16. Two running totals are used: RT1 and RT2 (to be doubled). Point subtraction is also used. Table 4 illustrates how each multiple of 1P up to 31P (that is, $2^w-1$) can be obtained:

TABLE 4

P256 Acceleration Table, Five Bit Windows Size, Multiples 1 and 2

| Multiple To Add | Method to Compute | Running total | Carry to next window |
|---|---|---|---|
| 1P | 1P | RT1 | 0 |
| 2P | 2 * P1 | RT2 | 0 |
| 3P | 3P | RT1 | 0 |
| 4P | 4P | RT1 | 0 |
| 5P | 5P | RT1 | 0 |
| 6P | 2 * 3P | RT2 | 0 |
| 7P | 7P | RT1 | 0 |
| 8P | 2 * 4P | RT2 | 0 |
| 9P | 9P | RT1 | 0 |
| 10P | 2 * 5P | RT2 | 0 |
| 11P | 11P | RT1 | 0 |
| 12P | 12P | RT1 | 0 |
| 13P | 13P | RT1 | 0 |
| 14P | 2 * 7P | RT2 | 0 |
| 15P | 15P | RT1 | 0 |
| 16P | 16P | RT1 | 0 |
| 17P | 32P − 15P | RT1 | 1 |
| 18P | 2 * 9P | RT2 | 0 |
| 19P | 32P − 13P | RT1 | 1 |
| 20P | 32P − 12P | RT1 | 1 |
| 21P | 32P − 11P | RT1 | 1 |
| 22P | 2 * 11P | RT2 | 0 |
| 23P | 32P − 9P | RT1 | 1 |
| 24P | 2 * 12P | RT2 | 0 |
| 25P | 32P − P7 | RT1 | 1 |
| 26P | 2 * 13P | RT2 | 0 |
| 27P | 32P − 5P | RT1 | 1 |
| 28P | 32P − 4P | RT1 | 1 |
| 29P | 32P − 3P | RT1 | 1 |
| 30P | 2 * 15P | RT2 | 0 |
| 31P | 32P − 1P | RT1 | 1 |

A binary method for computing an elliptic curve scalar multiplication kP for a scalar k and a point P when there is no acceleration table is:

```
total=zero
for each bit of k {
  if (bit set) {
    total=total+P
  }
  P=double (P)
}
```

For each bit of the size of the group there is a double; there is also an add if the bit of the scalar is set. On average only half the bits of the scalar are set. Hence, for a P256 curve, on average there are 256 doubles and 128 adds.

Given that one double takes 0.87 as much time as an add, the speed of a scalar multiply on the P256 curve is equivalent to:

$$= 0.87 * 256 + 128 \text{ adds}$$

$$= 350.7 \text{ adds}.$$

When calculating the theoretical speed of an acceleration table the following points should be remembered:

The point result from the first sub-table is added to zero. Adding to zero is an inexpensive operation when compared to adding two points. Hence, this can be ignored.

If a window is zero then no calculation occurs.

If a window is not zero then there is one add per sub-table.

If subtracting from $2^w$ is used (i.e. subtracting from the "1P" entry in the next sub-table), then the probability that an add will be required for the final single-entry sub-table is the probability that subtraction will be used in a sub-table. This possible final add can be shown to be impossible if the table is designed such that given the scalars to be applied to the table, no subtractions can be required.

If doubles are being used, there is one double for the entire scalar multiplication. If for all the sub-tables, none of the parts of the scalar applied to the sub-tables resulted in a point being added to the running total to be used for doubling, then the doubling operation would be doubling zero, which is an inexpensive operation.

Applying these points to the Crypto-C five bit table used for P256 with multipliers of 1 and 2:

The field size of P256 is 256 bits. The window size is 5 bits. The number of sub-tables=256/5=51.2. Rounding this up gives 52.

The window size is five bits, so the probability that a window is zero is 1/32. Hence the probability that it is not zero is 31/32≈0.97.

Given that the add for the first sub-table is free, there are 52 sub-tables, and the probability for any sub-table executing an add is 0.97, the average number of adds, due to adding up each sub-table is (52−1)*0.97.

Ten of the values are obtained using subtraction. Hence, the probability of needing to do a final add is 10/32≈0.31. However, for P256 the probability of having to add the "virtual" window value is zero, since only one bit of the last window is used. Even with a carry from the second last window, a subtraction will not be required in the last window.

To combine the running totals requires doubling the second running total, and adding it to the first. That is, 1 double and 1 add is required.

The number of adds and doubles required is:

$$= 1 \text{ double} + 1 \text{ add} + (52 - 1) * 0.97 \text{ adds}$$

$$= 1 \text{ double} + 50.47 \text{ adds}.$$

Given that one double takes 0.87 as much time as an add, the speed of the algorithm associated with the Crypto-C table is equivalent to:

speed=0.87+50.47 adds speed=51.34 adds.

The size of this acceleration table is given by:

size=11 points per sub-table×(ceiling(256/5) sub-tables)

size=11×52 points size=572 points

III. Using More than Two Running Totals

This technique can be extended to include more than two running totals. For example, a running total to be tripled (using double and add operations) or a running total to be quadrupled (using two double operations) could also be used. As the number of running totals used increases, the number of points in the acceleration table decreases, but the number of operations required to combine the running totals to complete the scalar multiplication also increases.

An acceleration table using more than two running tables may be referred to as an enhanced acceleration table (EAT).

A second example is provided with respect to a 6 bit window size using multipliers of 1, 2, 3, and 4. Table 5 for the P256 curve uses an EAT with a window size of six bits and indices 1, 5, 7, 8, 9, 11, 13, 17, 19, 23 and 29. Subtracting from the 1P value of the next sub-table is used. That is using reference values 0 and 1. Given a six bit window size, in Table 5, $2^w$ equals 64P, which equals 1P from the next sub-table. Doubling, tripling, and quadrupling are used. That is multiplying the running totals by 1, 2, 3, and 4. The indices are used as shown in table 5.

TABLE 5

P256 Acceleration Table, Six Bit Windows Size, Multiples 1, 2, 3, and 4

| Values | Multiples of Point | Indices | Operation | Carry to next window |
|---|---|---|---|---|
| 1 | P1 | 1 | Add | 0 |
| 2 | P1 × 2 | 1 | Add, Double | 0 |
| 3 | P1 × 3 | 1 | Add, Triple | 0 |
| 4 | P1 × 4 | 1 | Add, Quadruple | 0 |
| 5 | P5 | 5 | Add | 0 |
| 6 | P64 − P29 × 2 | 29 | Subtract, Double | 1 |
| 7 | P7 | 7 | Add | 0 |
| 8 | P8 | 8 | Add | 0 |
| 9 | P9 | 9 | Add | 0 |
| 10 | P5 × 2 | 5 | Add, Double | 0 |
| 11 | P11 | 11 | Add | 0 |
| 12 | P64 − P13 × 4 | 13 | Subtract, Quadruple | 1 |
| 13 | P13 | 13 | Add | 0 |
| 14 | P7 × 2 | 7 | Add, Double | 0 |
| 15 | P5 × 3 | 5 | Add, Triple | 0 |
| 16 | P8 × 2 | 8 | Add, Double | 0 |
| 17 | P17 | 17 | Add | 0 |
| 18 | P9 × 2 | 9 | Add, Double | 0 |
| 19 | P19 | 19 | Add | 0 |
| 20 | P5 × 4 | 5 | Add, Quadruple | 0 |
| 21 | P7 × 3 | 7 | Add, Triple | 0 |
| 22 | P11 × 2 | 11 | Add, Double | 0 |
| 23 | P23 | 23 | Add | 0 |
| 24 | P8 × 3 | 8 | Add, Triple | 0 |
| 25 | P64 − P13 × 3 | 13 | Subtract, Triple | 1 |
| 26 | P13 × 2 | 13 | Add, Double | 0 |
| 27 | P9 × 3 | 9 | Add, Triple | 0 |
| 28 | P7 × 4 | 7 | Add, Quadruple | 0 |
| 29 | P29 | 29 | Add | 0 |
| 30 | P64 − P17 × 2 | 17 | Subtract, Double | 1 |
| 31 | P64 − P11 × 3 | 11 | Subtract, Triple | 1 |
| 32 | P8 × 4 | 8 | Add, Quadruple | 0 |
| 33 | P11 × 3 | 11 | Add, Triple | 0 |
| 34 | P17 × 2 | 17 | Add, Double | 0 |
| 35 | P64 − P29 | 29 | Subtract | 1 |
| 36 | P9 × 4 | 9 | Add, Quadruple | 0 |
| 37 | P64 − P9 × 3 | 9 | Subtract, Triple | 1 |
| 38 | P19 × 2 | 19 | Add, Double | 0 |

TABLE 5-continued

P256 Acceleration Table, Six Bit Windows Size, Multiples 1, 2, 3, and 4

| Values | Multiples of Point | Indices | Operation | Carry to next window |
|---|---|---|---|---|
| 39 | P13 × 3 | 13 | Add, Triple | 0 |
| 40 | P64 − P8 × 3 | 8 | Subtract, Triple | 1 |
| 41 | P64 − P23 | 23 | Subtract | 1 |
| 42 | P64 − P11 × 2 | 11 | Subtract, Double | 1 |
| 43 | P64 − P7 × 3 | 7 | Subtract, Triple | 1 |
| 44 | P11 × 4 | 11 | Add, Quadruple | 0 |
| 45 | P64 − P19 | 19 | Subtract | 1 |
| 46 | P64 − P9 × 2 | 9 | Subtract, Double | 1 |
| 47 | P64 − P17 | 17 | Subtract | 1 |
| 48 | P64 − P8 × 2 | 8 | Subtract, Double | 1 |
| 49 | P64 − P5 × 3 | 5 | Subtract, Triple | 1 |
| 50 | P64 − P7 × 2 | 7 | Subtract, Double | 1 |
| 51 | P64 − P13 | 13 | Subtract | 1 |
| 52 | P13 × 4 | 13 | Add, Quadruple | 0 |
| 53 | P64 − P11 | 11 | Subtract | 1 |
| 54 | P64 − P5 × 2 | 5 | Subtract, Double | 1 |
| 55 | P64 − P9 | 9 | Subtract | 1 |
| 56 | P64 − P8 | 8 | Subtract | 1 |
| 57 | P64 − P7 | 7 | Subtract | 1 |
| 58 | P29 × 2 | 29 | Double | 0 |
| 59 | P64 − P5 | 5 | Subtract | 1 |
| 60 | P64 − P1 × 4 | 1 | Subtract, Quadruple | 1 |
| 61 | P64 − P1 × 3 | 1 | Subtract, Triple | 1 |
| 62 | P64 − P1 × 2 | 1 | Subtract, Double | 1 |
| 63 | P64 − P1 | 1 | Subtract | 1 |

The calculation of the speed of multiplication for table 5 for the second example P256 curve is shown below:

The field size of P256 is 256 bits. The window size is 6 bits. The number of sub-tables=256/6≈42.7. Rounding this value up gives 43.

The window size is six bits, so the probability that the part of the scalar applied to the sub-table is zero is 1/64. Hence the probability that it is not zero is 63/64≈0.984.

Given that the add for the first sub-table for each running total is free, there are 43 sub-tables, there are four running totals, and the probability for any sub-table executing an add is 0.984, the average number of adds due to adding up each sub-table is (43−4)*0.984.

For P256, the number of bits applied to the last window is 4 (256−(window size of 6)*42 sub-tables=4 bits). In the range of scalar values, 0 to 15, the number of values which are obtained using an operation which requires a carry (subtraction or addition of −P64) is 2. Hence the probability of needing to do a final add of the carry bit is 2/16=0.125.

Eighteen of the values are obtained by adding them to the running total for doubling, and then doubling that running total. The probability that at least one of the sub-tables uses a value which requires doubling is given by: $1-(1-18/64)^{43}{\approx}0.99999{\approx}1$. Hence, it is almost 100% likely that a double will be required.

Fourteen of the values are obtained by adding them to the running total for tripling, and then tripling that running total. The probability that at least one of the sub-tables uses a value which requires tripling is given by: $1-(1-14/64)^{43}{\approx}0.99998{\approx}1$. Hence, it is almost 100% likely that a triple will be required.

Nine of the values are obtained by adding them to the running total for quadrupling, and then quadrupling that running total. The probability that at least one of the sub-tables uses a value which requires quadrupling is given by: $1-(1-9/64)^{43}{\approx}0.998521{\approx}1$. Hence, it is almost 100% likely that a quadruple will be required.

Note that if a double, triple, and quadruple are done, then the running totals are combined using the method shown below. This results in only four Adds and two Doubles. Define:

RT1=Running total of values not to be doubled, tripled or quadrupled
RT2=Running total of values to be doubled
RT3=Running total of values to be tripled
RT4=Running total of values to be quadrupled
Total=combined total of all running totals.
Total=Add(RT1, Add(RT3, Double(Add(RT3, Add(RT2, Double(RT4))))))

The number of adds and doubles required is:

$$= \text{(add values from sub-tables)} + \text{(final virtual sub-table)} +$$
$$\text{(combine running totals)}$$
$$= ((43 - 4) * 0.984 \text{ adds}) + (0.125 \text{ adds}) + 2 \text{ doubles} + 4 \text{ adds}$$
$$= 2 \text{ doubles} + 42.45 \text{ adds}$$

Given that one double takes 0.87 as much time as an add, the speed of the algorithm associated with the EAT of table 5 is equivalent to:

$$\text{speed} = 0.87 * 2 + 42.45 \text{ adds}$$
$$= 44.19 \text{ adds}.$$

The size of this EAT is given by:

$$\text{size} = 11 \text{ points per sub-table} \times (\text{ceiling}(256/6) \text{sub-tables}) +$$
$$\text{one point for virtual table}$$
$$= 11 \times 43 + 1 \text{ points}$$
$$= 474 \text{ points}$$

For P256, the size of each point is 2×256/8=64 bytes. Hence, the size of this acceleration table is 64×474=30,336 bytes, which should fit within a 32 KB cache.

As an example, the use of the above acceleration table to assist the scalar multiplication for 1,007,330,694×P is now shown. 1,007,330,694 written in binary (as a 256 bit representation with its digits grouped in sixes to accommodate the 6 bit window size) is 111100 000010 101010 010110 000110 (the additional 226 leading zeros are omitted for clarity).

Starting from the right, 000110 in binary indicates 6 in base 10. P6=P64×P29×2. So, 1 is carried to the next sub-table and index 29 of the first sub-table is negated and stored in RT2.

Moving on to the next sub-table, 010110 in binary indicates 22 in base 10. However, there is a carry of 1, so we must consider the value 23. P23=P23. So, index 23 of the second sub-table is added to RT1.

Moving on to the next sub-table, 101010 in binary indicates 42 in base 10. P42=P64−P11×2. So, 1 is carried to the next sub-table and index 11 of the third sub-table is negated and added to RT2.

Moving on to the next sub-table, 000010 in binary indicates 2 in base 10. However, there is a carry of 1, so we must consider the value 3. P3=P1×3. So, there is no carry and index 1 of the fourth sub-table is added to RT3.

Moving on to the next sub-table, 111100 in binary indicates 60 in base 10. P60=P64−P1×4. So, there is a carry of 1 and index 1 of the fifth sub-table is negated and added to RT4.

Moving on to the next sub-table, 000000 in binary indicates 0 in base 10, but there is a carry of 1, so we must consider the value 1. P1=P1, so there is no carry and index 1 of the sixth sub-table is added to RT1.

The total sum of RT1=(23)($2^6$×P)+(1)($2^{30}$×P).

The total sum of RT2=(−29)($2^0$×P)+(−11)($2^{12}$×P).

The total sum of RT3=(1)($2^{18}$×P).

The total sum of RT4=(−1)($2^{24}$×P)

Accordingly, the scalar multiplication result is obtained by accumulating the running totals as follows: Result=RT1+RT3+2 (RT3+RT2+2×RT4).

IV. Reference Values Other than 0 and $2^{window\ size}$

Previously, all subtractions were relative to $2^w$, resulting in a carry of 1 to the next window. In one embodiment, a new way of using acceleration tables is to use reference values other than 0 and $2^w$: for instance additions relative to $-(2^w)$ and subtractions relative to $2\times(2^w)$. Note that these new reference values are multiples of $2^w$ which map to carrying integer values to the next window. Thus, for additions relative to $-(2^w)$, a carry of −1 is performed, while for subtractions relative to $2\times(2^w)$, a carry of 2 is performed.

The reference values which can be productively used depend on the multiples that are to be used with a sub-table. The largest positive and negative reference values are given by:

Largest negative ref value=−(maximum multiplier−1)×$2^w$

Largest positive ref value=maximum multiplier×$2^w$ where maximum multiplier is the maximum multiple to be used with the sub-table.

The values to be carried to the part of the scalar to be applied to the next sub-table range from:

−(maximum multiplier−1)

to:

maximum multiplier

This implies that the final sub-table will need to be able to handle values in this range, which includes negative scalar values.

An acceleration table for use with reference values other than 0 and $2^w$ may also be referred to as an enhanced acceleration table (EAT). This technique is of value because it allows the size of the EAT to be further reduced.

A third example is provided with respect to a 6 bit window size using multipliers of 1, 2, 3, and 4 as well as reference values other than 0 and $2^w$. The table below for the P256 curve uses an acceleration table with a window size of six bits and indices 1, 5, 7, 8, 9, 11, 13, 17, 19 and 29. Subtracting from the 1P and 2P values and adding to the −1P values of the next sub-table are used. That is, using reference values −1, 0, 1, and 2. Given a six bit window size, in the figure below $2^w$ equals 64P, which equals 1P from the next sub-table. Doubling, tripling, and quadrupling are used. That is, multiplying the running totals by 1, 2, 3, and 4. The indices are used as shown in table 6.

TABLE 6

P256 Acceleration Table, Six Bit Windows Size, Multiples 1, 2, 3, and 4 and other reference values

| Values | Multiples of Point | Indices | Operation | Reference Value |
|---|---|---|---|---|
| 1 | P1 | 1 | Add | 0 |
| 2 | P1 × 2 | 1 | Add, Double | 0 |
| 3 | P1 × 3 | 1 | Add, Triple | 0 |
| 4 | P1 × 4 | 1 | Add, Quadruple | 0 |
| 5 | P5 | 5 | Add | 0 |
| 6 | P64 − P29 × 2 | 29 | Subtract, Double | 1 |
| 7 | P7 | 7 | Add | 0 |
| 8 | P8 | 8 | Add | 0 |
| 9 | P9 | 9 | Add | 0 |
| 10 | P5 × 2 | 5 | Add, Double | 0 |
| 11 | P11 | 11 | Add | 0 |
| 12 | P64 − P13 × 4 | 13 | Subtract, Quadruple | 1 |
| 13 | P13 | 13 | Add | 0 |
| 14 | P7 × 2 | 7 | Add, Double | 0 |
| 15 | P5 × 3 | 5 | Add, Triple | 0 |
| 16 | P8 × 2 | 8 | Add, Double | 0 |
| 17 | P17 | 17 | Add | 0 |
| 18 | P9 × 2 | 9 | Add, Double | 0 |
| 19 | P19 | 19 | Add | 0 |
| 20 | P5 × 4 | 5 | Add, Quadruple | 0 |
| 21 | P7 × 3 | 7 | Add, Triple | 0 |
| 22 | P11 × 2 | 11 | Add, Double | 0 |
| 23 | −P64 + P29 × 3 | 29 | Add, Triple | −1 |
| 24 | P8 × 3 | 8 | Add, Triple | 0 |
| 25 | P64 − P13 × 3 | 13 | Subtract, Triple | 1 |
| 26 | P13 × 2 | 13 | Add, Double | 0 |
| 27 | P9 × 3 | 9 | Add, Triple | 0 |
| 28 | P7 × 4 | 7 | Add, Quadruple | 0 |
| 29 | P29 | 29 | Add | 0 |
| 30 | P64 − P17 × 2 | 17 | Subtract, Double | 1 |
| 31 | P64 − P11 × 3 | 11 | Subtract, Triple | 1 |
| 32 | P8 × 4 | 8 | Add, Quadruple | 0 |
| 33 | P11 × 3 | 11 | Add, Triple | 0 |
| 34 | P17 × 2 | 17 | Add, Double | 0 |
| 35 | P64 − P29 | 29 | Subtract | 1 |
| 36 | P9 × 4 | 9 | Add, Quadruple | 0 |
| 37 | P64 − P9 × 3 | 9 | Subtract, Triple | 1 |
| 38 | P19 × 2 | 19 | Add, Double | 0 |
| 39 | P13 × 3 | 13 | Add, Triple | 0 |
| 40 | P64 − P8 × 3 | 8 | Subtract, Triple | 1 |
| 41 | 2 × P64 − P29 × 3 | 29 | Subtract, Triple | 2 |
| 42 | P64 − P11 × 2 | 11 | Subtract, Double | 1 |
| 43 | P64 − P7 × 3 | 7 | Subtract, Triple | 1 |
| 44 | P11 × 4 | 11 | Add, Quadruple | 0 |
| 45 | P64 − P19 | 19 | Subtract | 1 |
| 46 | P64 − P9 × 2 | 9 | Subtract, Double | 1 |
| 47 | P64 − P17 | 17 | Subtract | 1 |
| 48 | P64 − P8 × 2 | 8 | Subtract, Double | 1 |
| 49 | P64 − P5 × 3 | 5 | Subtract, Triple | 1 |
| 50 | P64 − P7 × 2 | 7 | Subtract, Double | 1 |
| 51 | P64 − P13 | 13 | Subtract | 1 |
| 52 | P13 × 4 | 13 | Add, Quadruple | 0 |
| 53 | P64 − P11 | 11 | Subtract | 1 |
| 54 | P64 − P5 × 2 | 5 | Subtract, Double | 1 |
| 55 | P64 − P9 | 9 | Subtract | 1 |
| 56 | P64 − P8 | 8 | Subtract | 1 |
| 57 | P64 − P7 | 7 | Subtract | 1 |
| 58 | P29 × 2 | 29 | Double | 0 |
| 59 | P64 − P5 | 5 | Subtract | 1 |
| 60 | P64 − P1 × 4 | 1 | Subtract, Quadruple | 1 |
| 61 | P64 − P1 × 3 | 1 | Subtract, Triple | 1 |
| 62 | P64 − P1 × 2 | 1 | Subtract, Double | 1 |
| 63 | P64 − P1 | 1 | Subtract | 1 |

The calculation of the speed of multiplication for the algorithm associate with table 6 for a P256 curve is shown below:

The field size of P256 is 256 bits. The window size is 6 bits. The number of sub-tables=256/6≈42.7. Rounding this value up gives 43.

The window size is six bits, so the probability that the part of the scalar applied to the sub-table is zero is 1/64. Hence the probability that it is not zero is 63/64≈0.984.

Given the add for the first sub-table for each running total is free, there are 43 sub-tables, there are four running totals, and the probability for any sub-table executing an add is 0.984, the average number of adds, due to adding up each sub-table is (43−4)*0.984.

For P256, the number of bits applied to the last window is 4 (256−(window size of 6)*42 sub-tables=4 bits). In the range of scalar values, 0 to 15, the number of values which are obtained using an operation which requires a carry (subtraction or addition of −P64) is 2. Hence the probability of needing to do a final add of the carry bit is 2/16=0.125.

Eighteen of the values are obtained by adding them to the running total for doubling, and then doubling that running total. The probability that at least one of the sub-tables uses a value which requires doubling is given by: $1-(1-18/64)^{43} \approx 0.99999 \approx 1$. Hence, it is almost 100% likely that a double will be required.

Sixteen of the values are obtained by adding them to the running total for tripling, and then tripling that running total. The probability that at least one of the sub-tables uses a value which requires tripling is given by: $1-(1-16/64)^{43} \approx 0.99999 \approx 1$. Hence, it is almost 100% likely that a triple will be required.

Nine of the values are obtained by adding them to the running total for quadrupling, and then quadrupling that running total. The probability that at least one of the sub-tables uses a value which requires quadrupling is given by: $1-(1-9/64)^{43} \approx 0.998521 \approx 1$. Hence, it is almost 100% likely that a quadruple will be required.

Note that if a double, triple, and quadruple are done, then the running totals are combined using the method shown below. This result in only four adds and two doubles.

Define:

RT1=Running total of values not to be doubled, tripled, or quadrupled

RT2=Running total of values to be doubled

RT3=Running total of values to be tripled

RT4=Running total of values to be quadrupled

Total=combined total of all running totals.

Total=Add(RT1, Add(RT3, Double(Add(RT3, Add(RT2, Double(RT4))))))

The number of adds and doubles required is:

$$\text{(add values from sub-tables)} + \text{(final virtual sub-table)} +$$
$$\text{(combine running totals)}$$
$$= ((43-4)*0.984 \text{ adds}) + (0.125 \text{ adds}) + 2 \text{ doubles} + 4 \text{ adds}$$
$$= 2 \text{ doubles} + 42.45 \text{ adds}$$

Given that one double takes 0.87 as much time as an add, the speed of the algorithm associated with table 6 is equivalent to:

$$\text{speed} = 0.87*2 + 42.45 \text{ adds}$$
$$= 44.19 \text{ adds}.$$

The size of this EAT is given by:

$$\text{size} = 10 \text{ points per sub-table} \times (\text{ceiling}(256/6) \text{sub-table}) +$$
$$\text{one point for virtual table}$$
$$= 10 \times 43 + 1 \text{ points}$$
$$= 431 \text{ points}$$

For P256, the size of each point is 2×256/8=64 bytes. Hence, the size of this acceleration table is 64×431=27,584 bytes. This is about 91% the size of the table from the second example, which is comparable except for the lack of reference values aside from 0 and 1. That is a 10% reduction in size, which, under some circumstances, may increase the chances that the entire EAT will fit in a 32 KB level 1 cache.

As an example, the use of the above acceleration table to assist the scalar multiplication for 990,553,478×P is now shown. 990,553,478 written in binary (as a 256 bit representation with its digits grouped in sixes to accommodate the 6 bit window size) is 111011 000010 101010 010110 000110 (the additional 226 leading zeros are omitted for clarity).

Starting from the right, 000110 in binary indicates 6 in base 10. P6=P64−P29×2. So, 1 is carried to the next sub-table and index 29 of the first sub-table is negated and stored in RT2.

Moving on to the next sub-table, 010110 in binary indicates 22 in base 10. However, there is a carry of 1, so we must consider the value 23. P23=−P64+P29×3. So, −1 is carried to the next sub-table and index 29 of the second sub-table is added to RT3.

Moving on to the next sub-table, 101010 in binary indicates 42 in base 10. However, there is a carry of −1, so we must consider the value 41. P41=2×P64−P29×3. So, 2 is carried to the next sub-table and index 29 of the third sub-table is negated and added to RT3.

Moving on to the next sub-table, 000010 in binary indicates 2 in base 10. However, there is a carry of 2, so we must consider the value 4. P4=P1×4. So, there is no carry and index 1 of the fourth sub-table is added to RT4.

Moving on to the next sub-table, 111011 in binary indicates 59 in base 10. P59=P64−P5×1. So, there is a carry of 1 and index 5 of the fifth sub-table is negated and added to RT1.

Moving on to the next sub-table, 000000 in binary indicates 0 in base 10, but there is a carry of 1, so we must consider the value 1. P1=P1, so there is no carry and index 1 of the sixth sub-table is added to RT1.

The total sum of RT1=(−5)($2^{24}$×P)+(1)($2^{30}$×P).
The total sum of RT2=(−29)($2^{0}$×P).
The total sum of RT3=(29)($2^{6}$×P)+(−29)($2^{12}$×P).
The total sum of RT4=(1)($2^{18}$×P).

Accordingly, the scalar multiplication result is obtained by accumulating the running totals as follows: Result=RT1+RT3+2 (RT3+RT2+2×RT4).

V. Electronic Circuit Environment

Figure 1:
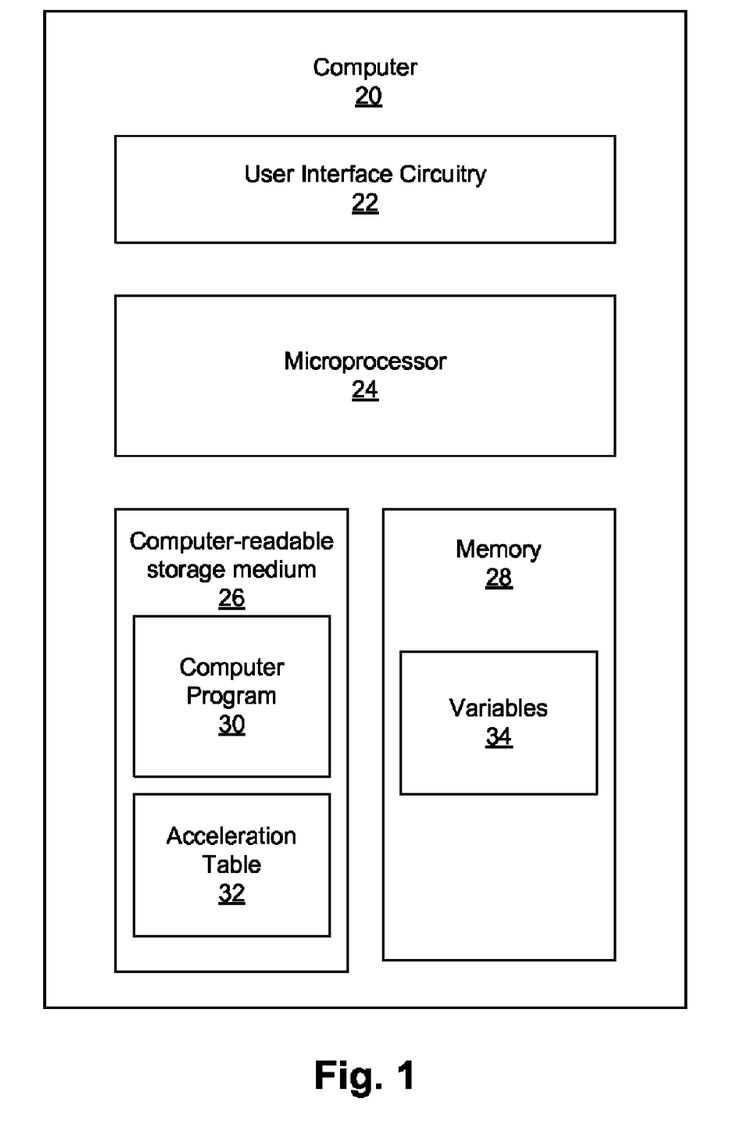
FIG. 1 illustrates an apparatus for use in performing various embodiments.

FIG. 1 shows a computer 20 for practicing the various techniques described herein. Computer 20 includes user interface circuitry 22 for communicating with a user, by means of, for example, a keyboard, a mouse, a trackpad, a trackball, a display screen, and/or a touch-sensitive display tablet. Computer 20 also includes a microprocessor 24 (such as, for example, a Core™ i7 processor produced by the Intel Corporation of Santa Clara, Calif.) for executing instructions. Computer 20 also includes a tangible computer readable storage medium 26 (such as, for example, a hard disk, a floppy disk, an optical disk, computer memory, flash memory, a combination thereof, etc.) and memory 28 (such as system memory, cache memory, DRAM, SRAM, a combination thereof, etc.). In some embodiments, memory 28 and computer readable storage medium 26 may be the same. Computer readable storage medium 26 stores a computer program 30 (which may include a set of instructions that can be performed by computer 20), as well as, in some embodiments, an ECC acceleration table 32. Memory 28 stores various variables 34. It should be understood that although computer readable storage medium 26 is shown as a part of computer 20, computer readable storage medium 26 may instead be independent of computer 20 and it may be external to computer 20 and be transferable between various devices.

During operation, microprocessor 24 executes computer program 30 using memory 28.

VI. Method

Figure 2:
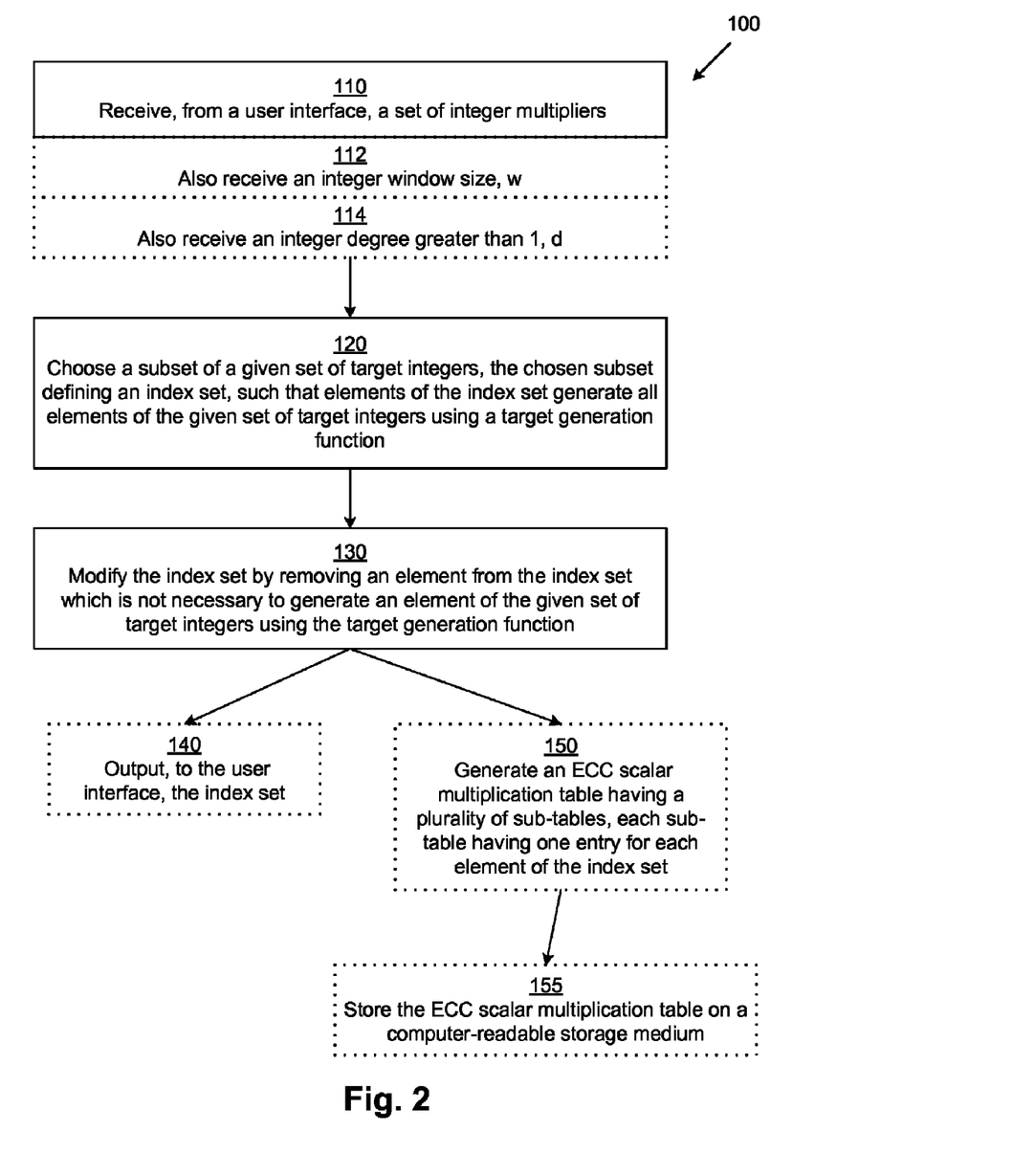
FIG. 2 illustrates a method of one embodiment.

FIG. 2 depicts a method 100 of various embodiments for determining the indices to be included in each sub-table of acceleration table 32. In some embodiments, the method may further generate the entire acceleration table 32.

The method may be performed within the computer 20. In step 110, microprocessor 24 receives, from the user interface, a set of integer multipliers. The set of integer multipliers defines what multipliers may be used in an ECC acceleration table. Thus, with respect to table 4 above, the set of integer multipliers would be $\{1, 2\}$, while with respect to tables 5 and 6 above, the set of integer multipliers would be $\{1, 2, 3, 4\}$. It should be noted that in some embodiments, the user separately enters in each multiplier, while in other embodiments, the user need only enter in a maximum multiplier, the set of integer multipliers being assumed to include all integer values from 1 to the maximum multiplier, inclusive. It should be noted that, as used in this Specification, the term "inclusive" means that when an interval is specified, both specified endpoints are included within the interval.

In optional step 112, microprocessor 24 receives, from the user interface, an integer window size w. Thus, with respect to table 4 above, w=5, while with respect to tables 5 and 6 above, w=6. In optional step 114, microprocessor 24 receives, from the user interface, an integer degree greater than 1, d. Degree d represents a degree of optimization to be described in detail below.

After receiving the appropriate user inputs in steps 110, 112, and 114, microprocessor 116 performs step 120. In step 120, microprocessor chooses a subset of a given set of target integers, the chosen subset defining an index set, such that elements of the index set generate all elements of the given set of target integers using a target generation function. In one embodiment, the given set of target integers is the set of integers from 1 to $2^w-1$, inclusive. This represents the multiples of the base point of each sub-table that may need to be generated in an accelerated ECC scalar multiplication operation. Thus, referring to table 6 above, since w=6, the given set of integers is $\{1, 2, 3, \ldots, 62, 63\}$. A subset of the given set of target integers is selected, thereby forming an initial index set. In one embodiment, all integers from 1 to $2^{w-1}$ are chosen for this initial index set, e.g., $\{1, 2, 3, \ldots 31, 32\}$, since as described above in section I (in connection with table 3), it is possible to generate all elements of the given set of target integers from such a subset. In another embodiment, the number 1 and all odd prime integers less than $2^{w-1}$ are chosen for this initial index set, e.g., $\{1, 3, 5, 7, 11, 13, 17, 19, 23, 29, 31\}$. In another embodiment, a more elaborate algorithm is used to generate the initial index set, to be described below in the next paragraph. The target generation function is a function that yields a set of integers that can be generated from each chosen index. The target generation function may vary based on what kind of acceleration is to be used in the ECC scalar multiplication. Thus, in connection with the acceleration described above in section III, the target generation function is configured to generate an element of the given set of target integers if that element can be calculated from an input element by (i) multiplying the input element by one multiplier of the set of integer multipliers, (ii) multiplying the product of step i by a value chosen from the set $\{-1, 1\}$, and (iii) if the chosen value is −1, then adding the product of step ii to $2^w$. In connection with the acceleration described above in section IV, the target generation function is configured to generate an element of the given set of target integers if that element can be calculated from an input element by (i) multiplying the input element by one multiplier of the set of integer multipliers, (ii) multiplying the product of step i by a value chosen from the set $\{-1, 1\}$, (iii) if the chosen value from step ii is −1, then adding the product of step ii to $2^w$ multiplied by a value chosen from the set $\{1, 2\}$, and (iv) if the chosen value from step ii is 1, then adding the product of step ii to $2^w$ multiplied by a value chosen from the set $\{-1, 0\}$.

In one embodiment, the initial index set is generated by the following algorithm:

First, an array of bit masks is created: index_mask[$2^w$]. This array has $2^w-1$ elements (assuming the array is indexed starting from 1—if it is 0-indexed than it has $2^w$ elements), and each element is set to be a bit mask which represents the values which can be generated by the index of the array using the set of multipliers according to the target generation function. Thus, referring back to the example of section III, since point P1 can generate P1, P2, P3, P4, P60, P61, P62, and P63 using multipliers $\{1, 2, 3, 4\}$, therefore index_mask[1]= 1111000000000000000000000000000000000000000000000000000000001111 (i.e., 4 ones representing 63, 62, 61, and 60, followed by 55 zeroes representing 59 through 5, followed by four ones representing 4, 3, 2, and 1). It should be noted that although bit masks are described herein as having higher order bits on the left, the algorithm would work just as well reversed, i.e., if the bit masks had the higher order bits on the right. As another example, index_mask[63]= 1000000000000000000000000000000000000000000000000000000000000001. In addition, a full_mask bit mask is created such that all bits from 1 to $2^w$ are set to 1. The algorithm will attempt to combine the elements of index_mask to create the full_mask. A temp_mask bit mask is also created, initially set to all zeroes. An indices list is also created to hold the initial index set. This indices list is initially set to have no elements.

Once the full_mask, temp_mask, and the index_mask[ ] have been created, a loop is entered into, the loop terminating once the temp_mask is equal to the full_mask. Inside the loop, the temp_mask is modified until eventually all its bits are set to 1 as follows: A max_new_num_bits variable is set to 0 and an index_of_max_new_num_bits variable is set to −1. Then a FOR loop is entered into for index=0 until index=$2^w$ (not inclusive), incrementing by 1 each iteration. Within this FOR loop, an a_mask bit mask is created to be equal to temp_mask. This a_mask bit mask is then logically bitwise OR-ed together with index_mask[index] (thereby altering the value of a_mask if index was not already set) in order to determine which elements can be generated by the current indices list if the current index is added to that list. A new_num_bits_set variable is set to the difference between the number of bits set in a_mask and the number of bits set in temp_mask. Iff this new_num_bits_set is larger than max_new_num_bits_set, then (i) max_new_num_bits_set is set to the value of new_num_bits_set, (ii) index_of_max_new_num_bits is set to the current index, and (iii) temp_mask is set to the value of a_mask. The FOR loop then iterates until completion, after which, whatever value is then stored in index_of_max_new_num_bits is added to the indices list, and the main loop restarts (so long as temp_mask is still not equal to the full_mask). Eventually, this procedure will yield temp_mask equal to the full_mask, at which point the initial index set will be complete.

In step 130, the microprocessor 24 modifies the index set by removing an element from the index set which is not necessary to generate an element of the given set of target integers using the target generation function. In some embodiments, a more elaborate procedure is followed. The first element of the index set is removed, and it is determined if the index set still generates the entire target set. If it does not, the first element is added back to the index set and the second element is removed, again testing if the index set still generated the entire target set. This process is repeated for each subsequent element of the index set until an element is found whose removal does not hinder the ability of the index set to continue to generate the entire target set (i.e., the set represented by full_mask). This entire process is repeated again, iterating through the remaining elements of the index set and removing unneeded elements until the entire index set has been iterated through without removing any elements. In some embodiments, at this point, the index set is fully modified.

In other embodiments, modification of the index set continues. In such embodiments, combinations of two indices are removed from the index set and replaced with a new element which was not in the index set. If this modified set still generates the target set, then this modification is retained and further sets of two elements are replaced with one other element until all combinations of two have been attempted to be removed without further success.

A similar process may then be performed by removing three elements from the index set and replacing those three elements with two elements not already in the index set if the modified set still generates the target set. This continues until all possible replacements of 2 elements for 3 elements have been tried.

In some embodiments, the process continues by removing n values from the index set and replacing these n values with n−1 values not in the index set if the modified set still generates the target set. This is performed for successively larger values of n. In some embodiments, the input degree, d, is used to set the maximum value of n to attempt.

Once d has been reached, the modification process may begin again, in some embodiments. Thus, one element may be removed at a time searching for an element whose removal does not hinder the ability of the index set to generate the target set, and then 2 elements are replaced with 1 element as described above, followed by replacing n elements with n−1 elements up until n=d. This whole procedure continues to loop as long as the size of the index set was decreased on the previous iteration. Once one entire iteration has passed without decreasing the size of the index set, the loop terminates and the final index set has been determined.

Once the final index set has been determined, either step 140 or step 150 is performed (or, in some embodiments, both steps 140 and 150). In step 140, the final index set is output across the user interface circuitry 22 so that the user can see the values. In step 150, the final index set is used to generate an ECC scalar multiplication acceleration table 32 having a plurality of sub-tables, each sub-table having one entry for each element of the index set. Thus, for example, if w=6 and the final index set is {1, 5, 7, 8, 9, 11, 13, 17, 19, 23, 29} (see table 5 above), then for P256 the ECC acceleration table 32 will look like in table 7 below:

TABLE 7

Structure of ECC acceleration table for final index set = {1, 5, 7, 8, 9, 11, 13, 17, 19, 23, 29}

| | | | | |
|---|---|---|---|---|
| $(2^{258}) * 1P$ | $(2^{252}) * 1P$ | ... | $(2^{6}) * 1P$ | 1P |
| | $(2^{252}) * 5P$ | | $(2^{6}) * 5P$ | 5P |
| | $(2^{252}) * 7P$ | | $(2^{6}) * 7P$ | 7P |
| | $(2^{252}) * 8P$ | | $(2^{6}) * 8P$ | 8P |
| | $(2^{252}) * 9P$ | | $(2^{6}) * 9P$ | 9P |
| | $(2^{252}) * 11P$ | | $(2^{6}) * 11P$ | 11P |
| | $(2^{252}) * 13P$ | | $(2^{6}) * 13P$ | 13P |
| | $(2^{252}) * 17P$ | | $(2^{6}) * 17P$ | 17P |
| | $(2^{252}) * 19P$ | | $(2^{6}) * 19P$ | 19P |
| | $(2^{252}) * 23P$ | | $(2^{6}) * 23P$ | 23P |
| | $(2^{252}) * 29P$ | | $(2^{6}) * 29P$ | 29P |

Finally, in step 155, the ECC acceleration table 32 may be stored in the computer-readable storage medium 26.

In one embodiment, method 100 may be performed by computer 20 in response to instructions stored in computer program 30.

VII. Conclusion

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

While various embodiments of the invention have been particularly shown and described, it will be understood by those skilled in the art that various changes in form and details may be made therein without departing from the spirit and scope of the invention as defined by the appended claims, and are intended to belong to certain embodiments.

For example, while the speed of scalar double operation has been described as requiring 0.87 as many operations as a scalar addition operation, in some embodiments of some systems, this relative speed may vary. Thus, in one system according to one embodiment, the speed of scalar double operation uses only 0.73 as many operations as a scalar addition operation.

What is claimed is:

1. A computer program product comprising a non-transitory computer-readable storage medium, the computer readable storage medium storing a set of instructions, which, when performed by a computer, cause the computer to perform the following steps:
   (a) receiving, from a user interface, a set of integer multipliers and an integer degree greater than 1, d;
   (b) choosing a subset of a given set of target integers, the chosen subset defining an index set, such that elements of the index set generate all elements of the given set of target integers using a target generation function;
   (c) modifying the index set by removing an element from the index set which is not necessary to generate an element of the given set of target integers using the target generation function;

(d) after modifying the index set, outputting, to the user interface, the index set;

(e) before outputting the index set, for some integer n, modifying the index set by replacing n elements with n−1 elements such that, after the modification, elements of the index set still generate all elements of the given set of target integers using the target generation function; and (f) before outputting the index set, repeating steps c and e in succession until no further elements can be removed or replaced from the index set; and wherein step f includes the following ordered sub-steps:

(1) performing step c repeatedly until no further elements can be removed from the index set;

(2) attempting to perform step e for n=2 until n=d or until step e is performed successfully, whichever occurs first; and (3) looping back to sub-step 1 if step e was successfully performed in sub-step 2, but terminating step f if step e was not successfully performed in sub-step 2.

2. A computer program product as in claim 1 wherein:

the set of instructions, when performed by the computer, cause the computer to further perform the step of receiving, from the user interface, an integer window size, w; and the given set of target integers consists of all integers between 1 and $2^w-1$, inclusive.

3. A computer program product as in claim 2 wherein the set of instructions, when performed by the computer, cause the computer to, when performing step (b), perform the following sub-steps:

(1) creating an index mask array, A, A being an array of $2^w$-bit bit masks with integer indices ranging from 1 to $2^{w-1}$ such that for each index, i, the corresponding bit mask is set to represent a set of integers which can be generated from that index using the target generation function;

(2) sequentially, for each index j of A:

logically bitwise OR-ing a best mask, B, B being a $2^w$-bit bit mask, with A[j] to form a temporary mask T; and if a number of set bits in T exceeds a number of set bits in B, then setting B=T and storing j as a best index, b;

(3) after completing sub-step 2, adding b to the index set; and (4) repeating sub-steps 2 and 3 sequentially until every element of B having an index from 1 to $2^{w-1}$, inclusive, is set to 1.

4. A computer program product as in claim 2 wherein the set of instructions, when performed by the computer, cause the computer to, when performing step (b), select a set containing the integer 1 and the odd prime integers less than $2^{w-1}$.

5. A computer program product as in claim 2 wherein the target generation function is configured to generate an element of the given set of target integers if that element can be calculated from an input element by:

(i) multiplying the input element by one multiplier of the set of integer multipliers;

(ii) multiplying the product of step i by a value chosen from the set {−1, 1}; and (iii) if the chosen value is −1, then adding the product of step ii to $2^w$.

6. A computer program product as in claim 2 wherein the target generation function is configured to generate an element of the given set of target integers if that element can be calculated from an input element by:

(i) multiplying the input element by one multiplier of the set of integer multipliers;

(ii) multiplying the product of step i by a value chosen from the set {−1, 1};

(iii) if the chosen value from step ii is −1, then adding the product of step ii to $2^w$ multiplied by a value chosen from the set {1, 2}; and (iv) if the chosen value from step ii is 1, then adding the product of step ii to $2^w$ multiplied by a value chosen from the set {−1, 0}.

7. A computer program product as in claim 1 wherein the set of instructions, when performed by the computer, cause the computer to further perform the steps of:

(g) after modifying the index set, generating an ECC scalar multiplication table having a plurality of sub-tables, each sub-table having one entry for each element of the index set; and (h) storing the ECC scalar multiplication table on a non-transitory computer-readable storage medium to be used in accelerating ECC scalar multiplication for cryptographic processing.

8. A method for creating an acceleration table for an Elliptic Curve Cryptography (ECC) scalar multiplication table, the method comprising:

(a) receiving, from user interface circuitry, a set of integer multipliers and an integer degree greater than 1, d;

(b) in a microprocessor, choosing a subset of a given set of target integers, the chosen subset defining an index set, such that elements of the index set generate all elements of the given set of target integers using a target generation function;

(c) in the microprocessor, modifying the index set by removing an element from the index set which is not necessary to generate an element of the given set of target integers using the target generation function;

(d) in the microprocessor, after modifying the index set, generating an ECC scalar multiplication table having a plurality of sub-tables, each sub-table having one entry for each element of the index set; and (e) storing the ECC scalar multiplication table on a non-transitory computer-readable storage medium;

(f) before generating the ECC scalar multiplication table, for some integer n, modifying the index set by replacing n elements with n−1 elements such that, after the modification, elements of the index set still generate all elements of the given set of target integers using the target generation function; and (g) before generating the ECC scalar multiplication table, repeating steps c and f in succession until no further elements can be removed or replaced from the index set;

wherein step g includes the following ordered sub-steps:

(1) performing step c repeatedly until no further elements can be removed from the index set;

(2) attempting to perform step f for n=2 until n=d or until step f is performed successfully, whichever occurs first; and (3) looping back to sub-step 1 if step f was successfully performed in sub-step 2, but terminating step g if step f was not successfully performed in sub-step 2.

9. A method as in claim 8 wherein:

receiving includes further receiving, from the user interface, an integer window size, w; and the given set of target integers consists of all integers between 1 and $2^w-1$, inclusive.

10. A method as in claim 9 wherein choosing the subset of the given set of target integers includes performing the following sub-steps:

(1) creating, in memory, an index mask array, A, A being an array of $2^w$-bit bit masks with integer indices ranging from 1 to $2^{w-1}$ such that for each index, i, the corresponding bit mask is set to represent a set of integers which can be generated from that index using the target generation function;

(2) sequentially, for each index j of A:

logically bitwise OR-ing a best mask, B, B being a $2^w$-bit bit mask, with A[j] to form a temporary mask T; and if a number of set bits in T exceeds a number of set bits in B, then setting B=T and storing j as a best index, b;

(3) after completing sub-step 2, adding b to the index set; and (4) repeating sub-steps 2 and 3 sequentially until every element of B having an index from 1 to $2^{w-1}$, inclusive, is set to 1.

11. A method as in claim 9 wherein choosing the subset of the given set of target integers includes selecting a set containing the integer 1 and the odd prime integers less than $2^{w-1}$.

12. A method as in claim 9 wherein the target generation function is configured to generate an element of the given set of target integers if that element can be calculated from an input element by:

(i) multiplying the input element by one multiplier of the set of integer multipliers;

(ii) multiplying the product of step i by a value chosen from the set $\{-1, 1\}$; and (iii) if the chosen value is −1, then adding the product of step ii to $2^w$.

13. A method as in claim 9 wherein the target generation function is configured to generate an element of the given set of target integers if that element can be calculated from an input element by:

(i) multiplying the input element by one multiplier of the set of integer multipliers;

(ii) multiplying the product of step i by a value chosen from the set $\{-1, 1\}$;

(iii) if the chosen value from step ii is −1, then adding the product of step ii to $2^w$ multiplied by a value chosen from the set $\{1, 2\}$; and (iv) if the chosen value from step ii is 1, then adding the product of step ii to $2^w$ multiplied by a value chosen from the set $\{-1, 0\}$.

14. A computer program product comprising a non-transitory computer-readable storage medium, the computer readable storage medium storing a set of instructions, which, when performed by a computer, cause the computer to perform the following steps:

(a) receiving, from a user interface, a set of integer multipliers;

(b) choosing a subset of a given set of target integers, the chosen subset defining an index set, such that elements of the index set generate all elements of the given set of target integers using a target generation function;

(c) modifying the index set by removing an element from the index set which is not necessary to generate an element of the given set of target integers using the target generation function; and (d) after modifying the index set, outputting, to the user interface, the index set;

wherein:

the set of instructions, when performed by the computer, cause the computer to further perform the step of receiving, from the user interface, an integer window size, w;

the given set of target integers consists of all integers between 1 and $2^w-1$, inclusive; and the set of instructions, when performed by the computer, cause the computer to, when performing step (b), perform the following sub-steps:

(1) creating an index mask array, A, A being an array of $2^w$-bit bit masks with integer indices ranging from 1 to $2^{w-1}$ such that for each index, i, the corresponding bit mask is set to represent a set of integers which can be generated from that index using the target generation function;

(2) sequentially, for each index j of A:

logically bitwise OR-ing a best mask, B, B being a $2^w$-bit bit mask, with A[j] to form a temporary mask T; and if a number of set bits in T exceeds a number of set bits in B, then setting B=T and storing j as a best index, b;

(3) after completing sub-step 2, adding b to the index set; and (4) repeating sub-steps 2 and 3 sequentially until every element of B having an index from 1 to $2^{w-1}$, inclusive, is set to 1.

15. A computer program product as in claim 14 wherein the target generation function is configured to generate an element of the given set of target integers if that element can be calculated from an input element by:

(i) multiplying the input element by one multiplier of the set of integer multipliers;

(ii) multiplying the product of step i by a value chosen from the set $\{-1, 1\}$; and (iii) if the chosen value is −1, then adding the product of step ii to $2^w$.

16. A computer program product as in claim 14 wherein the target generation function is configured to generate an element of the given set of target integers if that element can be calculated from an input element by:

(i) multiplying the input element by one multiplier of the set of integer multipliers;

(ii) multiplying the product of step i by a value chosen from the set $\{-1, 1\}$;

(iii) if the chosen value from step ii is −1, then adding the product of step ii to $2^w$ multiplied by a value chosen from the set $\{1, 2\}$; and (iv) if the chosen value from step ii is 1, then adding the product of step ii to $2^w$ multiplied by a value chosen from the set $\{-1, 0\}$.

17. A method for creating an acceleration table for an Elliptic Curve Cryptography (ECC) scalar multiplication table, the method comprising:

(a) receiving, from user interface circuitry, a set of integer multipliers;

(b) in a microprocessor, choosing a subset of a given set of target integers, the chosen subset defining an index set, such that elements of the index set generate all elements of the given set of target integers using a target generation function;

(c) in the microprocessor, modifying the index set by removing an element from the index set which is not necessary to generate an element of the given set of target integers using the target generation function;

(d) in the microprocessor, after modifying the index set, generating an ECC scalar multiplication table having a plurality of sub-tables, each sub-table having one entry for each element of the index set; and (e) storing the ECC scalar multiplication table on a non-transitory computer-readable storage medium;

wherein:

receiving includes further receiving, from the user interface circuitry, an integer window size, w;

the given set of target integers consists of all integers between 1 and $2^w-1$, inclusive; and choosing the subset of the given set of target integers includes performing the following sub-steps:

(1) creating, in memory, an index mask array, A, A being an array of $2^w$-bit bit masks with integer indices ranging from 1 to $2^{w-1}$ such that for each index, i, the corresponding bit mask is set to represent a set of integers which can be generated from that index using the target generation function;
(2) sequentially, for each index j of A:
logically bitwise OR-ing a best mask, B, B being a $2^w$-bit bit mask, with A[j] to form a temporary mask T; and
if a number of set bits in T exceeds a number of set bits in B, then setting B=T and storing j as a best index, b;
(3) after completing sub-step 2, adding b to the index set; and
(4) repeating sub-steps 2 and 3 sequentially until every element of B having an index from 1 to $2^{w-1}$, inclusive, is set to 1.

18. A method as in claim 17 wherein the target generation function is configured to generate an element of the given set of target integers if that element can be calculated from an input element by:
(i) multiplying the input element by one multiplier of the set of integer multipliers;
(ii) multiplying the product of step i by a value chosen from the set $\{-1, 1\}$; and
(iii) if the chosen value is $-1$, then adding the product of step ii to $2^w$.

19. A method as in claim 17 wherein the target generation function is configured to generate an element of the given set of target integers if that element can be calculated from an input element by:
(i) multiplying the input element by one multiplier of the set of integer multipliers;
(ii) multiplying the product of step i by a value chosen from the set $\{-1, 1\}$;
(iii) if the chosen value from step ii is $-1$, then adding the product of step ii to $2^w$ multiplied by a value chosen from the set $\{1, 2\}$; and
(iv) if the chosen value from step ii is 1, then adding the product of step ii to $2^w$ multiplied by a value chosen from the set $\{-1, 0\}$.

20. An apparatus comprising:
user interface circuitry;
a non-transitory computer-readable storage medium;
a microprocessor; and
memory, the memory storing instructions, which, when performed by the microprocessor, cause the microprocessor to perform the following steps:
(a) receiving, from the user interface circuitry, a set of integer multipliers;
(b) choosing a subset of a given set of target integers, the chosen subset defining an index set, such that elements of the index set generate all elements of the given set of target integers using a target generation function;
(c) modifying the index set by removing an element from the index set which is not necessary to generate an element of the given set of target integers using the target generation function;
(d) after modifying the index set, generating an ECC scalar multiplication table having a plurality of sub-tables, each sub-table having one entry for each element of the index set; and
(e) storing the ECC scalar multiplication table on the non-transitory computer-readable storage medium;
wherein:
receiving includes further receiving, from the user interface circuitry, an integer window size, w;
the given set of target integers consists of all integers between 1 and $2^w-1$, inclusive; and
choosing the subset of the given set of target integers includes performing the following sub-steps:
(1) creating, in memory, an index mask array, A, A being an array of $2^w$-bit bit masks with integer indices ranging from 1 to $2^{w-1}$ such that for each index, i, the corresponding bit mask is set to represent a set of integers which can be generated from that index using the target generation function;
(2) sequentially, for each index j of A:
logically bitwise OR-ing a best mask, B, B being a $2^w$-bit bit mask, with A[j] to form a temporary mask T; and
if a number of set bits in T exceeds a number of set bits in B, then setting B=T and storing j as a best index, b;
(3) after completing sub-step 2, adding b to the index set; and
(4) repeating sub-steps 2 and 3 sequentially until every element of B having an index from 1 to $2^{w-1}$, inclusive, is set to 1.

21. An apparatus comprising:
user interface circuitry;
a non-transitory computer-readable storage medium;
a microprocessor; and
memory, the memory storing instructions, which, when performed by the microprocessor, cause the microprocessor to perform the following steps:
(a) receiving, from the user interface circuitry, a set of integer multipliers and an integer degree greater than 1, d;
(b) choosing a subset of a given set of target integers, the chosen subset defining an index set, such that elements of the index set generate all elements of the given set of target integers using a target generation function;
(c) modifying the index set by removing an element from the index set which is not necessary to generate an element of the given set of target integers using the target generation function;
(d) after modifying the index set, generating an Elliptic Curve Cryptography (ECC) scalar multiplication table having a plurality of sub-tables, each sub-table having one entry for each element of the index set; and
(e) storing the ECC scalar multiplication table on the non-transitory computer-readable storage medium;
(f) before generating the ECC scalar multiplication table, for some integer n, modifying the index set by replacing n elements with n−1 elements such that, after the modification, elements of the index set still generate all elements of the given set of target integers using the target generation function; and
(g) before generating the ECC scalar multiplication table, repeating steps c and f in succession until no further elements can be removed or replaced from the index set;
wherein step g includes the following ordered sub-steps:
(1) performing step c repeatedly until no further elements can be removed from the index set;
(2) attempting to perform step f for n=2 until n=d or until step f is performed successfully, whichever occurs first; and
(3) looping back to sub-step 1 if step f was successfully performed in sub-step 2, but terminating step g if step f was not successfully performed in sub-step 2.

* * * * *